(12) United States Patent
Hummel et al.

(10) Patent No.: US 9,291,221 B2
(45) Date of Patent: Mar. 22, 2016

(54) BRAKE DUST COLLECTOR FOR MOTOR VEHICLES

(71) Applicant: MANN+HUMMEL GMBH, Ludwigsburg (DE)

(72) Inventors: Karl-Ernst Hummel, Bietigheim-Bissingen (DE); Bernhard Huurdeman, Freiberg (DE); Andreas Beck, Kirchheim (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 48 days.

(21) Appl. No.: 14/010,603

(22) Filed: Aug. 27, 2013

(65) Prior Publication Data

US 2014/0054119 A1  Feb. 27, 2014

(30) Foreign Application Priority Data

Aug. 27, 2012  (DE) .......................... 10 2012 016 836

(51) Int. Cl.
*F16D 65/00* (2006.01)

(52) U.S. Cl.
CPC .................................. *F16D 65/0031* (2013.01)

(58) Field of Classification Search
CPC . F16D 65/0031; F16D 65/827; F16D 65/847; B60S 1/62
See application file for complete search history.

(56) References Cited

U.S. PATENT DOCUMENTS

| 2,378,100 | A | * | 6/1945 | Pogue | 188/264 E |
| 2,746,577 | A | * | 5/1956 | Butler | 188/264 A |
| 5,035,304 | A | * | 7/1991 | Bosch | 188/71.1 |
| 5,671,827 | A | * | 9/1997 | Demetriou et al. | 188/71.6 |
| 2010/0096226 | A1 | * | 4/2010 | Gelb | 188/264 AA |

FOREIGN PATENT DOCUMENTS

| CH | 687013 | A5 | * | 8/1996 | | |
| DE | 102010053879 | A1 | | 6/2012 | | |
| FR | 991425 | A | * | 10/1951 | ............ | F16D 65/827 |
| FR | 1383257 | A | * | 12/1964 | ............ | B60K 7/00 |
| GB | 818474 | A | * | 8/1959 | ............ | B61H 5/00 |

* cited by examiner

*Primary Examiner* — Bradley King
*Assistant Examiner* — Stephen Bowes
(74) *Attorney, Agent, or Firm* — James Hasselbeck

(57) ABSTRACT

A brake dust collector for a motor vehicle for collecting brake dusk of a vehicle wheel brake has a dust collecting device with a filter element arranged in a filter receptacle. The filter element is designed as an exchangeable filter and is arranged exchangeable in a receiving space provided in the filter receptacle. The filter receptacle has a housing opening communicating with the receiving space. Through the housing opening the filter element is inserted into the receiving space and removed from the receiving space. The housing opening is located on a side of the filter receptacle that is facing away from the vehicle wheel brake.

11 Claims, 3 Drawing Sheets

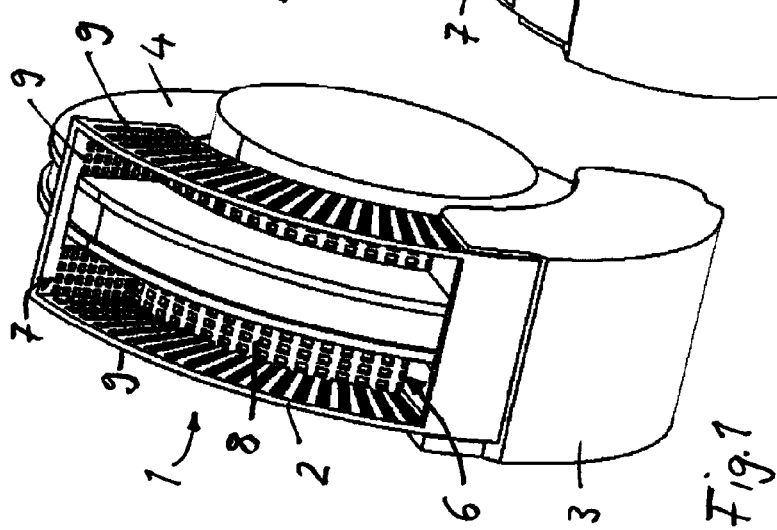
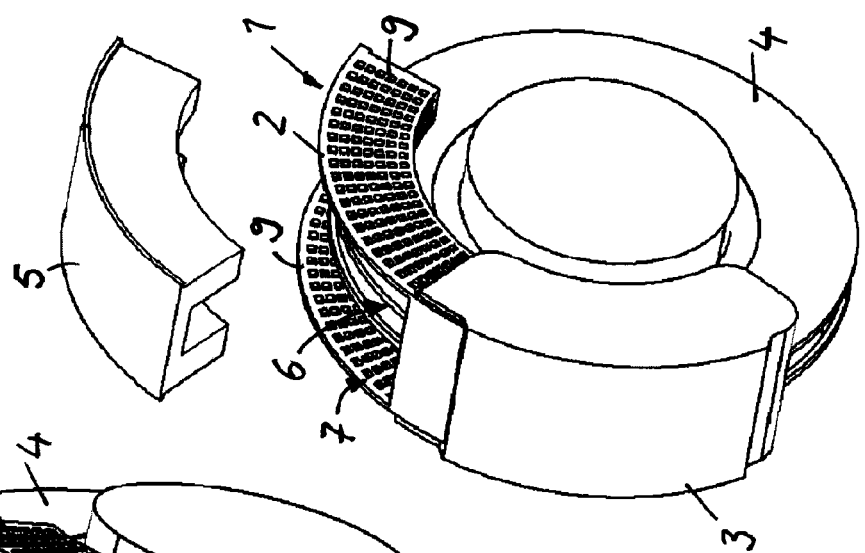
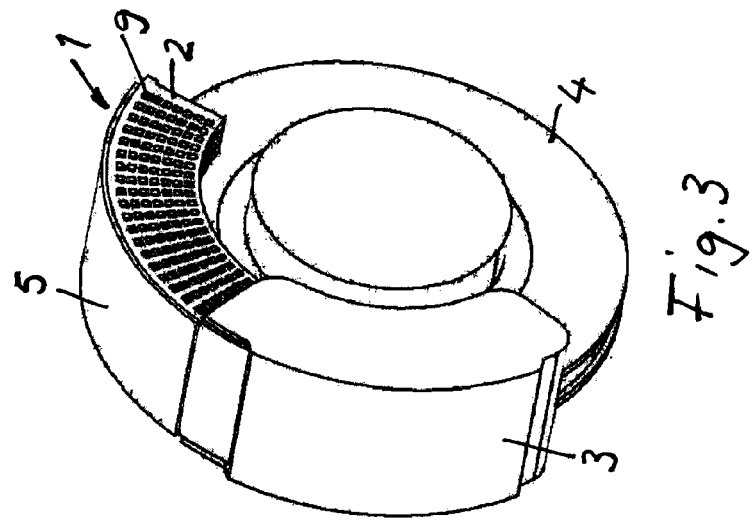

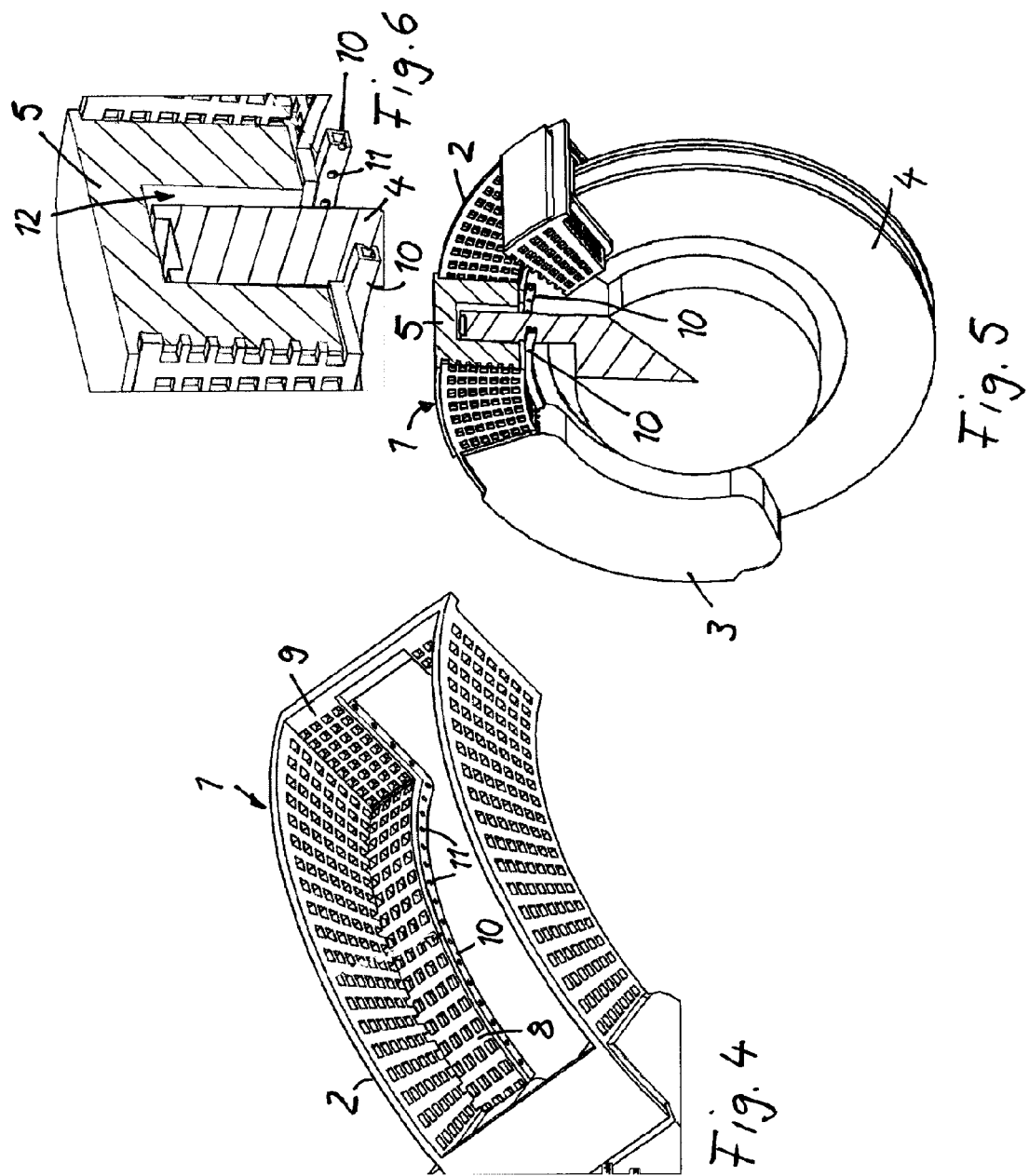

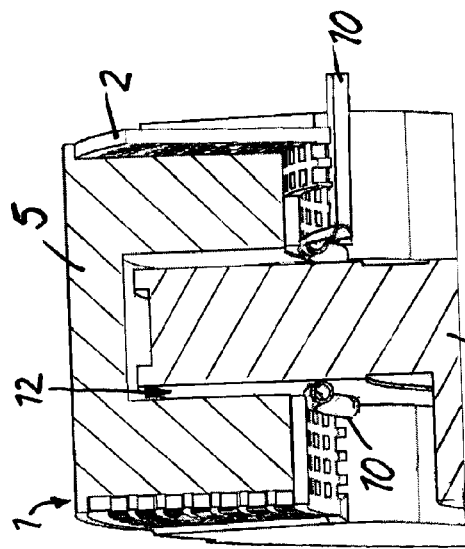
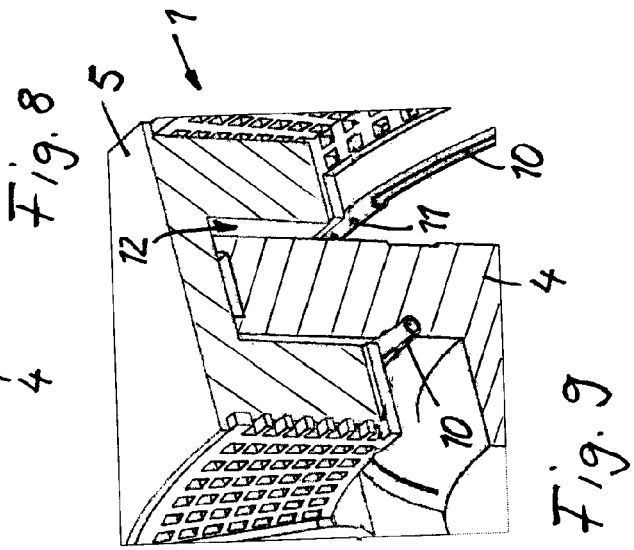
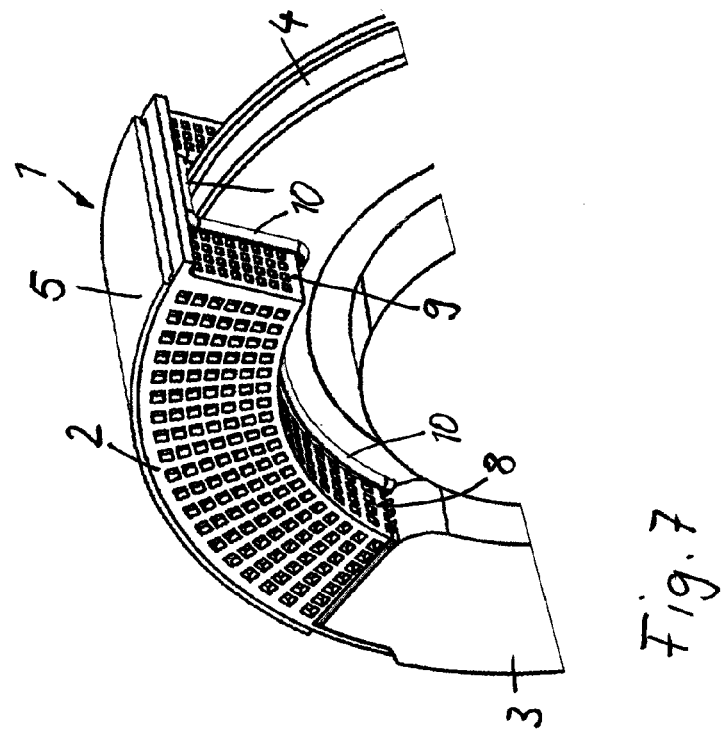

BRAKE DUST COLLECTOR FOR MOTOR VEHICLES

BACKGROUND OF THE INVENTION

The invention concerns a brake dust collector for motor vehicles for collecting brake dust of a vehicle wheel brake of a motor vehicle in a dust collecting device that comprises a filter element and a filter receptacle.

DE 10 2009 021 203 A1 discloses a brake dust collector for motor vehicles that serves for receiving brake dust of a vehicle wheel brake. The brake dust that is produced during braking is guided to a dust collecting device that is embodied as a filter element which is arranged at the radial outer edge of the brake disk and is extending across a defined angle section of the brake disk. This is a passive system that does not require a suction device. Instead, the produced brake dust is exclusively accelerated by the rotational movement of the brake disk or by flows across the brake disk in the direction of the filter element where it is collected.

According to a variant described in DE 10 2009 021 203 A1, the filter element is received in a filter housing that serves for safely housing the filter element as well as for fastening on the brake caliper. The filter housing surrounds the U-shaped filter element that is placed onto the brake disk and forms together with the filter element a constructive unit which must be exchanged as a whole for service and maintenance purposes.

EP 2 102 522 B1 discloses a brake dust collector for a brake disk in which a housing covers a section of the brake disk; in the housing, a brake dust retaining device with several brake dust inlet openings is provided.

It is the object of the invention to provide with simple constructive measures an efficient and service-friendly brake dust collector for a brake system of a motor vehicle.

SUMMARY OF THE INVENTION

In accordance with the present invention, this is achieved in that the filter element is embodied as an exchangeable filter and is exchangeability insertable into a receiving space in a filter receptacle wherein the receiving space in the filter receptacle is provided with a housing opening for insertion and removal of the filter element and the housing opening is located on the side of the filter receptacle that is facing away from the vehicle wheel brake.

On the side of the filter receptacle that is facing the vehicle wheel brake, the filter receptacle is provided with a support bottom on which the inserted filter element is supported.

The support bottom of the filter receptacle is concentric to the brake disk of the vehicle wheel brake.

The support bottom is provided with flow openings.

Sidewalls of the filter receptacle have flow openings.

The filter receptacle is connected to a brake caliper of the vehicle wheel brake or is monolithically integrated into the brake caliper.

An air passage is arranged at the filter receptacle and is provided with air exit openings oriented toward the brake disk.

On both faces of the brake disk, an air passage with air exit openings is arranged on the filter receptacle, respectively.

The air passage is monolithically formed together with the filter receptacle.

The air passage is embodied separate from the filter receptacle but is connected to the filter receptacle.

The brake dust collector according to the invention can be used in motor vehicles for collecting brake dust which is produced upon actuation of the vehicle wheel brake. The vehicle wheel brake comprises usually a brake disk on which the brake dust collector is arranged. The brake dust collector comprises a filter receptacle and a filter element arranged therein where the brake dust is collected. The brake dust collector is in particular of a segment-shaped configuration and extends across a limited defined angular section of the brake disk in the area of the brake disk outer rim. For an effective brake dust collection the filter element is expediently designed to have a U-shaped configuration, viewed in cross-section, and engages about the brake disk rim that is outwardly positioned in radial direction.

For a simplified but also inexpensive servicing action, the filter element is designed as an exchangeable filter (easy-change or disposable filter) which is exchangeably insertable into a receiving space in the filter receptacle. The receiving space in the filter receptacle has a housing opening by means of which the filter element is insertable into the filter receptacle or removable from it. The housing opening is located on the side that is facing away from the braking unit of the vehicle wheel brake, i.e., generally on the side that is facing away from the brake disk.

With this embodiment, it is possible to exchange the filter element as needed without there being the need for exchanging the filter receptacle at the same time. The filter receptacle, as a component of the brake dust collector, can therefore be disposed on the vehicle wheel brake for a long operating duration which surpasses the service life of the filter element. It is only required to remove the filter element from, or insert it into, the filter receptacle via the receiving opening. Accordingly, the filter element and the filter receptacle do not constitute a non-separable constructive unit but are designed as separate components; this configuration enables the problem-free exchange of the filter element. The housing opening is located in particular on the side that is radially opposite the brake disk so that the filter element can be inserted into, or removed from, the filter receptacle in radial direction. An arrangement of the housing opening in the circumferential direction or in the axial direction, relative to the coordinate system of the brake disk, is basically also possible. For this purpose, advantageously the filter element can be designed of a two-part configuration in order to ensure excellent accessibility.

The filter receptacle is in particular designed as a filter housing which houses the filter element. The receiving opening can be optionally closed by a housing lid (cover). In principle, it is also possible to provide an open configuration without such a housing lid wherein the filter element is preferably secured by straps, clips, locking noses, screws or similar fastening means in the filter receptacle.

The filter receptacle or the filter housing is in particular connected to the brake caliper of the vehicle wheel brake. For this purpose, embodiments are possible in which the filter receptacle is designed separate from the brake caliper but is connected by suitable fastening measures to the brake caliper, for example, by screwing. Embodiments in which the brake caliper and the filter receptacle form a common monolithic component are possible as well. The filter receptacle, for example, is embodied as a cast metal part wherein in case of a monolithic (one-piece) configuration the brake caliper is also formed as a cast metal part.

According to an expedient embodiment, it is provided that the filter receptacle on the side which is facing the vehicle wheel brake has a support bottom on which the inserted filter element is supported. The support bottom serves as a contact surface for the filter element in the radial direction wherein, optionally, walls can be provided in the filter receptacle also in the circumferential direction supporting. The inflow of the brake dust is realized through the gap between the wall surface of the brake disk and the inner wall of the filter receptacle which faces immediately the wall surface of the brake disk but is arranged at a minimal spacing relative to the wall surface. By rotation of the brake disk, the brake dust is conveyed tangentially in outward direction and can be deposited in the filter element which is housed in the filter receptacle.

For discharging the cleaned air that has been separated from the brake dust it may be expedient to introduce into the wall of the filter receptacle flow openings through which the cleaned air is guided out of the brake dust collector. The flow openings can be located in the support bottom of the filter receptacle as well as in the sidewalls.

According to a further expedient embodiment, on the filter receptacle an air passage is arranged in which air exit openings oriented toward the brake disk are provided. The air that is exiting through the air exit openings is oriented toward the brake disk and is deflected in the direction of the filter element so that the transport of the brake dust to the filter element is assisted in this way. At the same time, this airflow prevents an undesirable escape of brake dust out of the gap between the filter receptacle and the wall surface of the brake disk, in particular at low wheel speeds or immediately after braking the vehicle to a stop. Via the air passage and the air exit openings the air is guided though the gap, preferably up to the point of stopping of the vehicle, optionally also for a short period of time thereafter, e.g. a few seconds after complete stop of the vehicle, so that after braking of the vehicle no brake dust can fall back through the gap.

The air exit openings are facing the brake disk wherein optionally a directed (targeted) flow guiding action by providing flow passages in the direction of the brake disk or at an angle, with a component in the direction of the gap, may be expedient.

Advantageously, the air passage is connected with a pumping device for supplying air that is under pressure. This has the advantage that, independent of the actual driving situation or the vehicle speed and wheel speed, an air flow is provided that transports the brake dust in the direction of the filter element. A passive configuration without additional pumping device, where an air stream, generated by movement of the vehicle or of the brake disk, is guided into the air passage, is basically possible also.

Expediently, on both faces of the brake disk there are air passages with air exit openings provided at the filter receptacle. The air passage or the air passages can be formed monolithically with the filter receptacle. Moreover, an embodiment of the air passage as a separate component is possible, wherein the separate component is connected to the filter receptacle.

BRIEF DESCRIPTION OF THE DRAWINGS

FIG. 1 shows in a perspective illustration a brake dust collector for motor vehicles with a filter housing embodied as a filter cage for receiving a brake dust filter element.

FIG. 2 shows the brake dust collector including a filter element to be inserted in a further perspective illustration.

FIG. 3 is an illustration corresponding to that of FIG. 2 but with the filter element inserted into the filter housing.

FIG. 4 is a perspective individual illustration of the filter housing.

FIG. 5 shows the brake dust collector in a partially sectioned view.

FIG. 6 is an enlarged illustration of FIG. 5 in the area of the filter element wherein in the embodiment according to FIGS. 4 through 6 an air passage with air exit openings is provided monolithically with the filter housing on the inner side, respectively.

FIG. 7 shows a further embodiment in which on the inner side of the filter housing an air passage with air exit openings is provided wherein the air passage is designed as a separate component.

FIG. 8 is a sectioned detail view of FIG. 7.

FIG. 9 is another sectioned detail view of FIG. 7.

Same reference characters indicate same components throughout the drawings.

DESCRIPTION OF THE PREFERRED EMBODIMENTS

In the first embodiment according to FIGS. 1 to 3, a brake dust collector 1 for collecting brake dust is illustrated; brake dust is produced upon actuation of a vehicle wheel brake. The brake dust collector 1 comprises a filter housing 2 as well as a filter element 5 insertable into the filter housing 2. The brake dust will collect at the surface of the filter element 5 or within the filter element 5. The filter housing 2 is designed as a cast metal part and is monolithically embodied with the brake caliper 3 of the vehicle wheel brake. One component of the vehicle wheel brake is a brake disk 4 on which the brake caliper 3 as well as the brake dust collector 1 are arranged. The brake dust collector 1 with the filter housing 2 and the filter element 5 is of a segment-shaped configuration and extends across a limited defined angular range. The radial inner edge and the radial outer edge of the filter housing 2 as well as of the filter element 5 are formed to be of a circular arc shape and extend concentrically to the radial outwardly positioned rim of the brake disk 4. The edge of the filter housing 2 that is inwardly positioned in radial direction has a smaller radial spacing relative to the axis of rotation of the brake disk than the outwardly positioned rim of the brake disk; the edge of the filter housing 2 that is outwardly positioned in radial direction has a greater radial spacing relative to the axis of rotation of the brake disk than the outwardly positioned rim of the brake disk. The filter element 5, viewed in cross-section, is of a U-shaped configuration and surrounds the rim of the brake disk 4. The filter housing 2 has a corresponding configuration.

The filter housing 2 constitutes a filter receptacle and is designed as a filter cage. The filter housing 2 has a receiving space 6 for receiving the filter element 5 wherein the receiving space 6 and the filter element 5 are designed so as to correspond with each other. In the inserted state (FIG. 3), the filter element 5 completely fills the receiving space 6.

The receiving space 6 communicates on the side that is facing away from the brake disk 4 in radial direction with a housing opening 7 of the filter housing 2; by means of the housing opening 7, the filter element 5 is insertable into, and removable from, the receiving space 6 in the filter housing 2 in radial direction. The filter element 5 is an exchangeable filter (easy-change filter, disposable filter) which, for service purposes, can be removed from the receiving space 6 in the filter housing 2 and replaced with a new filter element. As a result of the monolithic configuration of the filter housing 2 with the brake caliper 3, the filter housing 2 remains in its position at the vehicle wheel brake when exchanging the filter element.

The filter housing 2 has in the receiving space 6 a support bottom 8 which forms the radial inwardly positioned housing wall of the filter housing 2 and supports the received filter element 5. Moreover, sidewalls 9 are provided that extend axially and in circumferential direction; the sidewalls 9 are formed monolithically with the support bottom 8. On both faces of the brake disk 4, receiving spaces 6 are provided in the filter housing 2 with appropriate walls and support bottoms for receiving the U-shaped filter element 5. As an alternative to the illustrated embodiment, an embodiment with a closed or air-permeable cover is advantageous.

In all wall sections of the filter housing 2 flow openings are provided which serve in particular for discharging cleaned air that has been separated from the brake dust. In an alternative embodiment, the support bottom 8 or the sidewall 9 is designed to be completely or partially closed across the periphery.

In FIGS. 4 to 6, a further embodiment of a brake dust collector 1 is illustrated. The basic configuration of the brake dust collector 1 corresponds to that of the first embodiment so that in this respect reference is being had to the description above. In FIGS. 4 to 6, an air passage 10 is additionally provided on the axial inner side of the support bottom 8 on the filter housing 2. The air passage 10 is provided with a plurality of air exit openings 11 that are pointing by means of a slanted passage wall axially inwardly in the direction toward the brake disk; in the mounted state (FIGS. 5 and 6), they are therefore directed onto the wall surface of the brake disk 4. Through the air passage 10, pressurized air is supplied that exits axially through the air exit openings 11 and impinges on the wall surface of the brake disk 4. The exiting air jet is radially deflected by the slanted passage wall and is then deflected in the direction of a gap 12 (FIG. 6) in downward direction. The gap 12 is provided between the wall surface of the brake disk 4 and the filter housing 2 as well as the filter element 5. In this way, it is ensured that a targeted air stream in the direction of the filter element 5 is realized and that moreover, upon braking or when the vehicles is stopped, no brake dust which has already been deposited on the filter element 5 can fall back through the gap 12.

The air passage 10 in the embodiment according to FIGS. 4 to 6 is monolithically formed together with the filter housing 2. The air passage 10 extends across the length of the support bottom 8 as well as across the height of the sidewall 9 extending in circumferential direction. As can be seen in FIGS. 5 and 6, on both faces of the brake disk 4 an air passage 10 with air exit openings 11 is arranged on the filter housing 2.

In the embodiment according to FIGS. 7 through 9, in analogy to the preceding embodiment an air passage 10 is arranged on the axial inner side of the filter housing 2 on the support bottom 8 and is provided with air exit openings 11 which are oriented directly, i.e., parallel to the axis of rotation of the brake disk, or at an angle thereto, onto the respective wall surface of the brake disk 4. The air passage 10 is designed as a separate component that is connected to the filter housing 2. The air passage 10 is continuous and extends on one side along the support bottom 8, extends along the sidewall 9 arranged in the circumferential direction, bridges the area in the filter housing 2 which spans the brake disk 4, and extends on the opposite face of the brake disk 4 correspondingly along the circumferential sidewall as well as along the support bottom provided thereat. It is therefore sufficient when the air passage 10 is connected only at one location with a pumping device or an air guiding section in order to generate an air stream that is directed by means of the air exit openings 11 at both sides onto the respective wall surface of the brake disk 4.

While specific embodiments of the invention have been shown and described in detail to illustrate the inventive principles, it will be understood that the invention may be embodied otherwise without departing from such principles.

What is claimed is:

1. A brake dust collector for a motor vehicle for collecting brake dust of a vehicle wheel brake of a vehicle wheel, the brake dust collector comprising:
   a dust collecting device comprising a filter element arranged in a filter receptacle;
   wherein a radial direction is defined as a direction perpendicular to a rotation axis of the vehicle wheel;
   wherein the filter receptacle extends over a radial outer edge of a brake disk of the vehicle wheel brake, the receptacle having
      a first axial sidewall spaced axially outwardly from and extending over a first face of the brake disk; and
      an opposing second axial sidewall of the filter receptacle spaced axially outwardly from and extending over an opposing second face of the brake disk, such that a portion of the brake disk is arranged within the filter receptacle between the first and second axial sidewalls of the filter receptacle;
   wherein the filter receptacle with the brake disk forms a U-shaped receiving space into which the filter element is arranged, the receiving space extending axially over the radial outer edge of a brake disk and radially downwardly over the first face and the opposing second face of the brake disk such that the portion of the brake disk within the filter receptacle is in the receiving space;
   a tubular air passage arranged on the filter receptacle, the tubular air passage having a plurality of spaced apart air exit openings, the air exit openings arranged on the tubular air passage and opening in a direction facing the brake disk, directing airflow from the tubular air passage through the plurality of air exit openings onto the brake disk;
   wherein the filter receptacle is arranged on a brake caliper of the vehicle wheel brake;
   wherein the filter element is designed as an exchangeable U-shaped filter and is arranged exchangeably in the receiving space provided in the filter receptacle;
   wherein the filter receptacle has a housing opening communicating with the receiving space and enabling insertion of the filter element into the receiving space and removal of the filter element from the receiving space;
   wherein the housing opening is arranged on a radially outer side of the filter receptacle opening radially outwardly over the radial outer edge of the brake disk;
   wherein the filter element is inserted in a radial direction through the housing opening and received into the receiving space in the filter receptacle.

2. The brake dust collector according to claim 1, wherein the filter receptacle comprises
   a support bottom that is disposed on a radially inner side of the filter receptacle,
   wherein the filter element when inserted into the receiving space is supported on the support bottom.

3. The brake dust collector according to claim 2, wherein the support bottom extends axially from the first axial sidewall or opposing second axial sidewall of the filter receptacle towards the brake disk of the vehicle wheel brake.

4. The brake dust collector according to claim 2, wherein the support bottom has flow openings.

5. The brake dust collector according to claim 2, wherein sidewalls of the filter receptacle have flow openings.

6. The brake dust collector according to claim 1, wherein the filter receptacle is connected with the brake caliper of the vehicle wheel brake.

7. The brake dust collector according to claim 1, wherein the filter receptacle is monolithically integrated into the brake caliper of the vehicle wheel brake.

8. The brake dust collector according to claim 1, wherein two of said tubular air passages are provided,
   wherein a first one of said tubular air passages is arranged proximate to the first face of the brake disk and with the air exit openings opening in a direction of the first face of the brake disk and
   a second one of said tubular air passages is arranged proximate to the opposing second face of the brake disk and with the air exit openings opening in a direction of the second face of the brake disk.

9. The brake dust collector according to claim 1, wherein the tubular air passage is monolithically formed together with the filter receptacle.

10. The brake dust collector according to claim 1, wherein the tubular air passage is embodied as a separate component from the filter receptacle but is arranged on and connected to the filter receptacle.

11. A brake dust collector for a motor vehicle for collecting brake dust of a vehicle wheel brake of a vehicle wheel, the brake dust collector comprising:
    a dust collecting device comprising a filter element arranged in a filter receptacle;
    wherein a radial direction is defined as a direction perpendicular to a rotation axis of the vehicle wheel;
    wherein the filter receptacle extends over a radial outer edge of a brake disk of the vehicle wheel brake, the receptacle comprising
    a first axial sidewall spaced axially outwardly from and extending over a first face of the brake disk;
    an opposing second axial sidewall of the filter receptacle spaced axially outwardly from and extending over an opposing second face of the brake disk, such that a portion of the brake disk is arranged within the filter receptacle between the first and second axial sidewalls of the filter receptacle;
    a first support bottom wall extending from the first axial sidewall towards the brake disk; and
    a second support bottom wall extending from the second axial sidewall towards the brake disk;
    wherein the filter element is an exchangeable filter element having
    a first leg arranged between the first axial sidewall and the brake disk; and
    a second leg arranged between the second axial sidewall and the brake disk;
    wherein a first gap is formed between the first leg and the brake disk;
    wherein a second gap is formed between the second leg and the brake disk;
    a tubular air passage arranged on the first support bottom wall and positioned at a nearest edge of the first support bottom wall to the brake disk, the tubular air passage having a plurality of spaced apart air exit openings, the air exit openings are positioned at and immediately facing the brake disk and discharging airflow directly onto the brake disk between the edae of the first bottom support wall and the brake disk.

* * * * *